US012651752B2

(12) United States Patent
Li et al.

(10) Patent No.: US 12,651,752 B2
(45) Date of Patent: Jun. 9, 2026

(54) SECONDARY BATTERY, BATTERY MODULE, BATTERY PACK, AND ELECTRICAL DEVICE

(71) Applicant: CONTEMPORARY AMPEREX TECHNOLOGY (HONG KONG) LIMITED, Hong Kong (CN)

(72) Inventors: Xuan Li, Ningde City (CN); Xin Sun, Ningde City (CN); Lili Wu, Ningde City (CN); Huisen Su, Ningde City (CN); Jianren Wei, Ningde City (CY); Xingbu Chen, Ningde City (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 516 days.

(21) Appl. No.: 18/324,992

(22) Filed: May 28, 2023

(65) Prior Publication Data

US 2023/0352692 A1     Nov. 2, 2023

Related U.S. Application Data

(63) Continuation of application No. PCT/CN2022/072109, filed on Jan. 14, 2022.

(51) Int. Cl.
| | |
|---|---|
| *H01M 4/62* | (2006.01) |
| *H01M 4/133* | (2010.01) |
| *H01M 4/587* | (2010.01) |

(52) U.S. Cl.
CPC ........... *H01M 4/628* (2013.01); *H01M 4/133* (2013.01); *H01M 4/587* (2013.01); *H01M 4/625* (2013.01)

(58) Field of Classification Search
CPC ...................................................... H01M 4/628
See application file for complete search history.

(56) References Cited

U.S. PATENT DOCUMENTS

2025/0015258 A1*    1/2025    Kim .................. H01M 10/0525

FOREIGN PATENT DOCUMENTS

| CN | 105074991 A | 11/2015 |
|---|---|---|
| CN | 105140449 A | 12/2015 |

(Continued)

OTHER PUBLICATIONS

The first office action received in the counterpart European Application 22919483.2, mailed on Dec. 2, 2024.

(Continued)

*Primary Examiner* — Brian R Ohara
(74) *Attorney, Agent, or Firm* — K&L Gates LLP

(57) ABSTRACT

A secondary battery, a battery module, a battery pack, and an electrical device are provided. The secondary battery includes a negative electrode plate, a positive electrode plate, and a separator located between the negative electrode plate and the positive electrode plate. The negative electrode plate or the separator includes a safety coating. A negative electrode charge capacity Nc and a positive electrode charge capacity Pc of the secondary battery satisfy: $0.45 \leq Nc/Pc < 1$, and/or, a negative electrode discharge capacity Nd and a positive electrode discharge capacity Pd of the secondary battery satisfy: $0.45 \leq Nd/Pd < 1$. By setting the values of Nc/Pc and/or Nd/Pd and disposing the safety coating in the secondary battery, this application achieves good cycle performance and safety performance while maintaining a high energy density of the secondary battery.

20 Claims, 3 Drawing Sheets

(56) References Cited

FOREIGN PATENT DOCUMENTS

| | | | |
|---|---|---|---|
| CN | 109103496 | A | 12/2018 |
| CN | 110148697 | A | 8/2019 |
| CN | 110783528 | A | 2/2020 |
| CN | 112467117 | A | 3/2021 |
| CN | 112670516 | A | 4/2021 |
| CN | 113140872 | A | 7/2021 |
| EP | 3598540 | A1 | 1/2020 |
| JP | 2006179468 | A | 7/2006 |

OTHER PUBLICATIONS

International Search Report receiving in the corresponding International Application PCT/CN2022/072109, mailed Sep. 23, 2022.
The extended European search report received in the corresponding European Application 22919483.2, mailed on Jun. 3, 2024.
Office Action, mailed Jun. 6, 2025, for corresponding European Patent Application No. 22919483.2.
English translation of International Search Report receiving in the corresponding International Application PCT/CN2022/072109, mailed Sep. 23, 2022.
Office Action, mailed Jan. 2, 2026, for corresponding European Patent Application Serial No. 22919483.2.

* cited by examiner

200

SECONDARY BATTERY, BATTERY MODULE, BATTERY PACK, AND ELECTRICAL DEVICE

TECHNICAL FIELD

This application relates to the electrochemical field, and in particular, to a secondary battery, a battery module, a battery pack, and an electrical device.

BACKGROUND

By virtue of a high energy storage density, a high open circuit voltage, a low self-discharge rate, a long cycle life, high safety, and other advantages, secondary batteries are widely applied in various fields such as electrical energy storage, mobile electronic devices, electric vehicles, and aerospace equipment. As the mobile electronic devices and the electric vehicles come to a stage of rapid development, higher requirements are imposed on the energy density, cycle performance, safety performance, and other performance of the secondary batteries in the market.

However, a lithium dendrite structure formed during charge-and-discharge cycles of a secondary battery severely affects the energy density, cycle performance, and safety performance of the secondary battery. Therefore, how to suppress the growth of lithium dendrites and thereby improve the energy density, cycle performance, and safety performance of the secondary battery has become an urgent important problem to be solved during extensive applications of the secondary batteries.

SUMMARY

An objective of this application is to provide a secondary battery, a battery module, a battery pack, and an electrical device to increase an energy density of the secondary battery while achieving good cycle performance and safety performance.

To achieve the foregoing objective, this application provides a secondary battery, a battery module, a battery pack, and an electrical device.

A first aspect of this application provides a secondary battery. The secondary battery includes a negative electrode plate, a positive electrode plate, and a separator located between the negative electrode plate and the positive electrode plate. The negative electrode plate or the separator includes a safety coating. A negative electrode charge capacity Nc and a positive electrode charge capacity Pc of the secondary battery satisfy: $0.45 \leq Nc/Pc < 1$, and/or, a negative electrode discharge capacity Nd and a positive electrode discharge capacity Pd of the secondary battery satisfy: $0.45 \leq Nd/Pd < 1$. By setting the values of the Nc/Pc ratio and/or the Nd/Pd ratio and disposing the safety coating in the secondary battery, this application increases the energy density while achieving good cycle performance and safety performance of the secondary battery.

In any embodiment, the negative electrode plate includes a negative current collector and a negative film layer disposed on at least one surface of the negative current collector. The safety coating is disposed on a surface of the negative film layer. In this way, formed lithium dendrites are reduced effectively, and the probability of the lithium dendrites piercing the separator and directly contacting the positive electrode plate is also reduced. Therefore, this application increases the energy density while achieving good cycle performance and safety performance of the secondary battery.

In any embodiment, the safety coating is disposed on a first surface that is of the separator and that is oriented toward the negative electrode plate. In this way, formed lithium dendrites are reduced effectively, and the probability of the lithium dendrites piercing the separator and directly contacting the positive electrode plate is also reduced. Therefore, this application increases the energy density while achieving good cycle performance and safety performance of the secondary battery.

In any embodiment, the negative electrode charge capacity Nc and the positive electrode charge capacity Pc of the secondary battery satisfy: $0.5 \leq Nc/Pc \leq 0.85$. In this way, the energy density of the secondary battery is increased effectively. In addition, excess lithium ions deposited on the surface of the negative electrode plate are reduced effectively. Therefore, the lithium dendrites on the surface of the negative electrode plate are reduced greatly, and in turn, the cycle performance and safety performance of the secondary battery are improved.

In any embodiment, the negative electrode discharge capacity Nd and the positive electrode discharge capacity Pd of the secondary battery satisfy: $0.5 \leq Nd/Pd \leq 0.87$. In this way, the energy density of the secondary battery is increased effectively. In addition, excess lithium ions deposited on the surface of the negative electrode plate are reduced effectively. Therefore, the lithium dendrites on the surface of the negative electrode plate are reduced greatly, and in turn, the cycle performance and safety performance of the secondary battery are improved.

In any embodiment, a negative film layer includes a negative active material. The negative active material includes at least one of graphite, a silicon-carbon composite, silicon oxide, tin oxide, iron oxide ($Fe_3O_4$), or titanium oxide. In this way, less lithium metal is deposited on the surface of the negative electrode plate, and the lithium dendrites on the surface of the negative electrode plate are reduced greatly, and in turn, the cycle performance and safety performance of the secondary battery are improved. The lithium metal and the negative active material form a composite lithium metal material, thereby increasing the energy density of the secondary battery.

In any embodiment, the safety coating includes an additive and a carbon material. The additive includes at least one of a simple metal of gold or silver or magnesium or aluminum, an oxide of silver or magnesium or aluminum, a nitrate, or a phosphate. The carbon material includes at least one of graphite, graphene, or carbon nanotubes. Therefore, this application increases the energy density while achieving good cycle performance and safety performance of the secondary battery.

In any embodiment, a mass ratio between the additive and the carbon material is (0.05 to 100):100, optionally (10 to 80):100, and further optionally (20 to 50):100. By controlling the mass ratio between the additive and the carbon material to fall within the above range, this application reduces the lithium dendrites formed on the surface of the negative electrode plate without affecting other performance (such as rate performance) of the secondary battery, and in turn, increases the energy density while achieving good cycle performance and safety performance of the secondary battery.

In any embodiment, the additive includes at least one of the oxide of silver or magnesium or aluminum, the nitrate, or the phosphate. A mass ratio between the additive and the carbon material is (0.05 to 100):100, optionally (15 to 80):100, and further optionally (25 to 60):100. With the above material being the additive, by controlling the mass ratio between the additive and the material to fall within the above range, this application further alleviates the formation of lithium dendrites on the surface of the negative electrode plate, and in turn, further increases the energy density of the secondary battery, and achieves good cycle performance and safety performance of the secondary battery.

In any embodiment, a thickness of the safety coating is 0.5 μm to 15 μm. By controlling the thickness of the safety coating to fall within the above range, the lithium dendrites formed on the surface of the negative electrode plate are reduced, and the probability of the lithium dendrites piercing the separator and directly contacting the positive electrode plate is also reduced. Therefore, this application further increases the energy density of the secondary battery while achieving good cycle performance and safety performance of the secondary battery.

In any embodiment, the negative electrode plate includes a negative current collector and a negative film layer disposed on at least one surface of the negative current collector. The safety coating is disposed on a surface of the negative film layer. A thickness of the safety coating is 0.5 μm to 15 μm, and optionally 3 μm to 10 μm. By controlling the thickness of the safety coating to fall within the above range, the lithium dendrites formed on the surface of the negative electrode plate are reduced, and the probability of the lithium dendrites piercing the separator and directly contacting the positive electrode plate is also reduced. Therefore, this application further increases the energy density of the secondary battery while achieving good cycle performance and safety performance of the secondary battery.

In any embodiment, the safety coating is disposed on a first surface that is of the separator and that is oriented toward the negative electrode plate. A thickness of the safety coating is 0.5 μm to 15 μm, and optionally 3 μm to 10 μm. By controlling the thickness of the safety coating to fall within the above range, the lithium dendrites formed on the surface of the negative electrode plate are reduced, and the probability of the lithium dendrites piercing the separator and directly contacting the positive electrode plate is also reduced. Therefore, this application further increases the energy density of the secondary battery while achieving good cycle performance and safety performance of the secondary battery.

A second aspect of this application provides a battery module. The battery module includes the secondary battery according to the first aspect of this application.

A third aspect of this application provides a battery pack. The battery pack includes the battery module according to the second aspect of this application.

A fourth aspect of this application provides an electrical device. The electrical device includes at least one of the secondary battery according to the first aspect of this application, the battery module according to the second aspect of this application, or the battery pack according to the third aspect of this application.

Beneficial effects of this application are as follows:

This application provides a secondary battery, a battery module, a battery pack, and an electrical device. The secondary battery includes a negative electrode plate, a positive electrode plate, and a separator located between the negative electrode plate and the positive electrode plate. The negative electrode plate or the separator includes a safety coating. A negative electrode charge capacity Nc and a positive electrode charge capacity Pc of the secondary battery satisfy: $0.45 \leq Nc/Pc < 1$, and/or, a negative electrode discharge capacity Nd and a positive electrode discharge capacity Pd of the secondary battery satisfy: $0.45 \leq Nd/Pd < 1$. By setting the values of the Nc/Pc ratio and/or the Nd/Pd ratio and disposing the safety coating in the secondary battery, this application increases the energy density while achieving good cycle performance and safety performance of the secondary battery.

Figure 1:
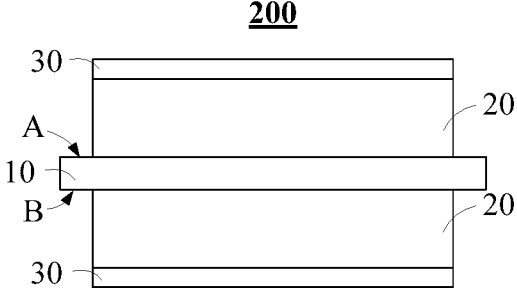
FIG. 1 is a schematic structural diagram of a cross section of a negative electrode plate according to some embodiments of this application.

REFERENCE NUMERALS 1. battery pack; 2. upper box; 3. lower box; 4. battery module; 5. secondary battery; 10. negative current collector; 20. negative film layer; 30. safety coating; 51. housing; 52. electrode assembly; 53. cover plate; 100. separator; 200. negative electrode plate; 300. positive electrode plate.

DETAILED DESCRIPTION OF EMBODIMENTS

The following describes and discloses in detail embodiments of a secondary battery, a battery module, a battery pack, and an electrical device according to this application with due reference to drawings. However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by a lower limit and an upper limit selected. The selected lower and upper limits define the boundaries of a particular range. A range so defined may be inclusive or exclusive of the end values, and a lower limit of one range may be arbitrarily combined with an upper limit of another range to form a range. For example, if a given parameter falls within a range of 60 to 120 and a range of 80 to 110, it is expectable that the parameter may fall within a range of 60 to 110 and a range of 80 to 120 as well. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, a numerical range "0 to 5" herein means all real numbers recited between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on.

Unless otherwise expressly specified herein, any embodiments and preferred embodiments hereof may be combined with each other to form a new technical solution.

Unless otherwise expressly specified herein, any technical features and preferred technical features hereof may be combined with each other to form a new technical solution.

Unless otherwise expressly specified herein, "include" and "comprise" mentioned herein mean open-ended inclusion, or closed-ended inclusion. For example, the terms "include" and "comprise" may mean inclusion of other items that are not set out, or inclusion of only the items set out.

Unless otherwise expressly specified herein, the term "or" is inclusive. For example, the expression "A or B" means "A alone, B alone, or both A and B". More specifically, any one of the following conditions satisfies the condition "A or B": A is true (or existent) and B is false (or absent); A is false (or absent) and B is true (or existent); and, both A and B are true (or existent).

In a process of researching the secondary battery, the applicant hereof finds that excess lithium ions generated by a negative electrode plate during a charge-and-discharge cycle are deposited on a surface of the negative electrode plate, and are prone to cause volume expansion of the secondary battery. In addition, due to non-uniformity of a current density and a lithium ion concentration in an electrolytic solution, lithium ions are deposited too quickly at some sites during deposition, thereby forming dendrite structures that severely affect the energy density and cycle performance of the secondary battery. Moreover, with the increase of the charge-and-discharge cycles, the lithium dendrites become sharper, and are very prone to pierce a separator and directly contact a positive electrode plate to form a short circuit and cause severe safety hazards. Therefore, this application primarily deals with how to improve the cycle performance and safety performance of the secondary battery and increase the energy density of the secondary battery by reducing the lithium dendrites formed on the surface of the negative electrode plate, with a view to improving the performance such as a longer cruising range and a longer service life of the secondary battery applied to an electrical device. To this end, this application provides a secondary battery, a battery module, a battery pack, and an electrical device.

In an embodiment of this application, this application discloses a secondary battery. The secondary battery includes a negative electrode plate, a positive electrode plate, and a separator located between the negative electrode plate and the positive electrode plate. The negative electrode plate or the separator includes a safety coating. A negative electrode charge capacity Nc and a positive electrode charge capacity Pc of the secondary battery satisfy: $0.45 \leq Nc/Pc < 1$, and/or, a negative electrode discharge capacity Nd and a positive electrode discharge capacity Pd of the secondary battery satisfy: $0.45 \leq Nd/Pd < 1$. In this application, the negative electrode plate is also referred to as a negative electrode, and the positive electrode plate is also referred to as a positive electrode.

Although the underlying mechanism still remains unclear, the applicant hereof unexpectedly finds that: in this application, the negative electrode charge capacity Nc and the positive electrode charge capacity Pc of the secondary battery are made to satisfy: $0.45 \leq Nc/Pc < 1$, and/or, the negative electrode discharge capacity Nd and the positive electrode discharge capacity Pd of the secondary battery are made to satisfy: $0.45 \leq Nd/Pd < 1$, so that a reversible capacity of the positive electrode is higher than a reversible capacity of the negative electrode. In this way, the excess lithium ions of the positive electrode in contrast to the negative electrode, in the form of lithium metal, react with a negative active material to form a composite lithium metal material during charging of the secondary battery, thereby effectively increasing the energy density of the secondary battery. In addition, excess lithium ions deposited on the surface of the negative electrode plate are reduced effectively. Therefore, the lithium dendrites on the surface of the negative electrode plate are reduced greatly, and in turn, the cycle performance and safety performance of the secondary battery are improved. In addition, the negative electrode plate or separator includes a safety coating, so that lithium ions are deposited under the safety coating. Through physical isolation, the safety coating reduces the lithium dendrites formed on the surface of the negative electrode plate. In addition, during the charge-and-discharge cycles of the secondary battery, the safety coating combines with the lithium ions to form an alloy, thereby further reducing the lithium dendrites formed on the surface of the negative electrode plate. Therefore, this application increases the energy density effectively while achieving good cycle performance and safety performance of the secondary battery.

In general, in the secondary battery provided in this application, the negative electrode plate or separator includes a safety coating. A negative electrode charge capacity Nc and a positive electrode charge capacity Pc of the secondary battery satisfy: $0.45 \leq Nc/Pc < 1$, and/or, a negative electrode discharge capacity Nd and a positive electrode discharge capacity Pd of the secondary battery satisfy: $0.45 \leq Nd/Pd < 1$. The secondary battery achieves a high energy density in addition to good cycle performance and safety performance.

In this application, the Nc/Pc ratio is made to be less than 1 and/or the Nd/Pd ratio is made to be less than 1 by: (i) reducing a mass percent ($k_1$) of the negative active material in the negative film layer or reducing a coating mass ($cw_1$) of the negative film layer per unit area of the surface of the negative electrode plate; or (ii) increasing a mass percent ($k_2$) of the positive active material in the positive film layer or increasing a coating mass ($cw_2$) of the positive film layer per unit area of the surface of the positive electrode plate.

In some embodiments, the negative electrode plate includes a negative current collector and a negative film layer disposed on at least one surface of the negative current collector. The safety coating is disposed on a surface of the negative film layer. As an example, the negative current collector includes two surfaces opposite to each other in a thickness direction thereof. The negative film layer is disposed on either or both of the two opposite surfaces of the negative current collector. The "surface" here may be the entire region of the negative current collector, or a partial region of the negative current collector. The safety coating being disposed on the surface of the negative film layer means that the safety coating is disposed on the entire surface of the negative film layer. As an example, as shown in FIG. 1, the negative electrode plate 200 includes a negative current collector 10 and a negative film layer 20 disposed on two opposite surfaces A and B of the negative current collector 10. Each of two safety coatings 30 is independently disposed on a surface that is of the negative film layer 20 and that is oriented away from the negative current collector 10. The safety coating is disposed on the surface of the negative film layer. During the charge-and-discharge cycles of the secondary battery, lithium ions are deposited under the safety coating, that is, deposited on a side that is of the safety coating and that is adjacent to the negative film layer. Through physical isolation, the safety coating reduces the lithium dendrites formed on the surface of the negative electrode plate, that is, reduces the lithium dendrites formed on the surface that is of the safety coating and that is close to the positive electrode plate. In addition, during the charge-and-discharge cycles of the secondary battery, the safety coating combines with the lithium ions to form an alloy, thereby further reducing the lithium dendrites formed on the surface of the negative electrode plate. In this way, formed lithium dendrites are reduced effectively, and the probability of the lithium dendrites piercing the separator and directly contacting the positive electrode plate is also reduced. In this way, the secondary battery achieves a high energy density in addition to good cycle performance and safety performance.

Figure 2:
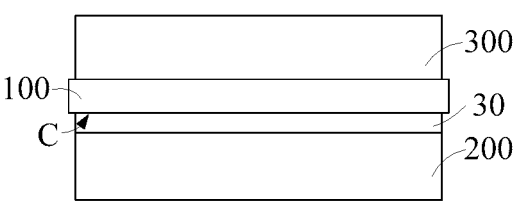
FIG. 2 is a schematic structural diagram of a position at which a safety coating is disposed according to some other embodiments of this application.

In some embodiments, the safety coating is disposed on a first surface that is of the separator and that is oriented toward the negative electrode plate. As an example, as shown in FIG. 2, the separator 100 is located between positive electrode plate 300 and the negative electrode plate 200, and the safety coating 30 is disposed on the first surface C that is of the separator 100 and that is oriented toward the negative electrode plate 200. During the charge-and-discharge cycles of the secondary battery, lithium ions are deposited under the safety coating, that is, deposited on a side that is of the safety coating and that is adjacent to the negative electrode plate. Through physical isolation, the safety coating reduces the lithium dendrites formed on the surface of the negative electrode plate. In addition, the safety coating combines with the lithium ions to form an alloy, thereby further reducing the lithium dendrites formed on the surface of the negative electrode plate. In this way, formed lithium dendrites are reduced effectively, and the probability of the lithium dendrites piercing the separator and directly contacting the positive electrode plate is also reduced. In this way, the secondary battery achieves a high energy density in addition to good cycle performance and safety performance.

In some embodiments, the negative electrode charge capacity Nc and the positive electrode charge capacity Pc of the secondary battery satisfy: $0.5 \leq Nc/Pc \leq 0.85$. In this way, a reversible capacity of the positive electrode is higher than a reversible capacity of the negative electrode. Therefore, the excess lithium ions of the positive electrode in contrast to the negative electrode, in the form of lithium metal, react with the negative active material to form a composite lithium metal material during charging of the secondary battery, thereby effectively increasing the energy density of the secondary battery. In addition, excess lithium ions deposited on the surface of the negative electrode plate are reduced effectively. Therefore, the lithium dendrites on the surface of the negative electrode plate are reduced greatly, and in turn, the cycle performance and safety performance of the secondary battery are improved.

In some embodiments, the negative electrode discharge capacity Nd and the positive electrode discharge capacity Pd of the secondary battery satisfy: $0.5 \leq Nd/Pd \leq 0.87$. In this way, a reversible capacity of the positive electrode is higher than a reversible capacity of the negative electrode. Therefore, the excess lithium ions of the positive electrode in contrast to the negative electrode, in the form of lithium metal, react with the negative active material to form a composite lithium metal material during charging of the secondary battery, thereby effectively increasing the energy density of the secondary battery. In addition, excess lithium ions deposited on the surface of the negative electrode plate are reduced effectively. Therefore, the lithium dendrites on the surface of the negative electrode plate are reduced greatly, and in turn, the cycle performance and safety performance of the secondary battery are improved.

In some embodiments, a negative electrode charge capacity Nc and a positive electrode charge capacity Pc of the secondary battery satisfy: $0.5 \leq Nc/Pc \leq 0.85$, and a negative electrode discharge capacity Nd and a positive electrode discharge capacity Pd of the secondary battery satisfy: $0.5 \leq Nd/Pd \leq 0.87$. In this way, a reversible capacity of the positive electrode is much higher than a reversible capacity of the negative electrode. Therefore, the excess lithium ions of the positive electrode in contrast to the negative electrode, in the form of lithium metal, react with the negative active material to form a composite lithium metal material during charging of the secondary battery, thereby effectively increasing the energy density of the secondary battery. In addition, excess lithium ions deposited on the surface of the negative electrode plate are reduced effectively. Therefore, the lithium dendrites on the surface of the negative electrode plate are reduced greatly, and in turn, the cycle performance and safety performance of the secondary battery are improved.

In some embodiments, a negative film layer includes a negative active material. The negative active material includes at least one of graphite, a silicon-carbon composite, silicon oxide, tin oxide, iron oxide, or titanium oxide. The negative active material used above provides a storage space for the lithium deintercalated from the positive electrode. Pores between negative active material particles provide a space for deposited lithium. In this way, less lithium metal is deposited on the surface of the negative electrode plate, and the lithium dendrites on the surface of the negative electrode plate are reduced greatly, and in turn, the cycle performance and safety performance of the secondary battery are improved. The lithium metal and the negative active material form a composite lithium metal material, thereby increasing the energy density of the secondary battery.

In some embodiments, the safety coating includes an additive and a carbon material. The additive includes at least one of a simple metal of gold or silver or magnesium or aluminum, an oxide of silver or magnesium or aluminum, a nitrate, or a phosphate. The carbon material includes at least one of graphite, graphene, or carbon nanotubes. The carbon material in use provides a space for deposited lithium. The additive in use effectively improves the safety coating, and increases uniformity of the current density on the surface of the negative electrode plate, so that the lithium metal can be uniformly deposited on the surface of the negative electrode plate. In addition, the additive can combine with the lithium ions to form an alloy to further suppress the formation of the lithium dendrites on the surface of the negative electrode plate. In this way, formed lithium dendrites are reduced effectively, and the probability of the lithium dendrites piercing the separator and directly contacting the positive electrode plate is also reduced. Therefore, this application increases the energy density while achieving good cycle performance and safety performance of the secondary battery.

In some embodiments, a mass ratio between the additive and the carbon material is (0.05 to 100):100, optionally (10 to 80):100, and further optionally (20 to 50):100. For example, the mass ratio between the additive and the carbon material is 0.05:100, 1:100, 5:100, 10:100, 15:100, 20:100, 30:100, 40:100, 50:100, 60:100, 70:100, 80:100, 90:100, 100:100, or a value falling within a range formed by any two thereof. The content of the additive in the safety coating affects electrical conductivity of the safety coating and the content of the alloy formed from the additive and the lithium ions. The additive added in the safety coating increases electrical conductivity of the safety coating, and can form more alloy with the lithium ions to suppress the formation of lithium dendrites on the surface of the negative electrode plate. However, an excessive content of the additive (for example, when the mass ratio between the additive and the carbon material is higher than 100:100) is prone to cause a short circuit, or increase a resistance of the negative electrode plate, intensify polarization, and affect the rate performance of the secondary battery. By controlling the mass ratio between the additive and the carbon material to fall within the above range, this application reduces the lithium dendrites formed on the surface of the negative electrode plate without affecting other performance (such as rate performance) of the secondary battery, and in turn, increases the energy density of the secondary battery while achieving good cycle performance and safety performance of the secondary battery.

In some embodiments, the additive includes at least one of the oxide of silver or magnesium or aluminum, the nitrate, or the phosphate. A mass ratio between the additive and the carbon material is (0.05 to 100):100, optionally (15 to 80):100, and further optionally (25 to 60):100. For example, the mass ratio between the additive and the carbon material is 0.05:100, 1:100, 5:100, 10:100, 15:100, 20:100, 25:100, 30:100, 40:100, 50:100, 60:100, 70:100, 80:100, 90:100, 100:100, or a value falling within a range formed by any two thereof. The oxide, nitrate, and phosphate differ from a simple metal thereof in terms of electrical conductivity. With the above material being the additive, by controlling the mass ratio between the additive and the material to fall within the above range, this application further alleviates the formation of lithium dendrites on the surface of the negative electrode plate, and in turn, further increases the energy density of the secondary battery, and achieves good cycle performance and safety performance of the secondary battery.

In some embodiments, the thickness of the safety coating is 0.5 μm to 15 μm. For example, the thickness of the safety coating is 0.5 μm, 1 μm, 3 μm, 5 μm, 7 μm, 9 μm, 10 μm, 11 μm, 13 μm, 15 μm, or a value falling within a range formed by any two thereof. If the thickness of the safety coating is deficient (for example, less than 0.5 μm), the effect of the safety coating is not fully exerted. If the thickness of the safety coating is excessive (for example, greater than 15 μm), the energy density of the secondary battery decreases and the impedance increases. By controlling the thickness of the safety coating to fall within the above range, the lithium dendrites formed on the surface of the negative electrode plate are reduced, and the probability of the lithium dendrites piercing the separator and directly contacting the positive electrode plate is also reduced. Therefore, this application further increases the energy density of the secondary battery while achieving good cycle performance and safety performance of the secondary battery.

In some embodiments, the negative electrode plate includes a negative current collector and a negative film layer disposed on at least one surface of the negative current collector. The safety coating is disposed on a surface of the negative film layer. A thickness of the safety coating is 0.5 μm to 15 μm, and optionally 3 μm to 10 μm. For example, the thickness of the safety coating is 0.5 μm, 1 μm, 3 μm, 5 μm, 8 μm, 10 μm, 11 μm, 13 μm, 15 μm, or a value falling within a range formed by any two thereof. By controlling the thickness of the safety coating to fall within the above range, the lithium dendrites formed on the surface of the negative electrode plate are reduced, and the probability of the lithium dendrites piercing the separator and directly contacting the positive electrode plate is also reduced. Therefore, this application further increases the energy density of the secondary battery while achieving good cycle performance and safety performance of the secondary battery.

In some embodiments, the safety coating is disposed on a first surface that is of the separator and that is oriented toward the negative electrode plate. A thickness of the safety coating is 0.5 μm to 15 μm, and optionally 3 μm to 10 μm. For example, the thickness of the safety coating is 0.5 μm, 1 μm, 3 μm, 5 μm, 8 μm, 10 μm, 11 μm, 13 μm, 15 μm, or a value falling within a range formed by any two thereof. By controlling the thickness of the safety coating to fall within the above range, the lithium dendrites formed on the surface of the negative electrode plate are reduced, and the probability of the lithium dendrites piercing the separator and directly contacting the positive electrode plate is also reduced. Therefore, this application further increases the energy density of the secondary battery while achieving good cycle performance and safety performance of the secondary battery.

Generally, the secondary battery includes a positive electrode plate, a negative electrode plate, an electrolyte, and a separator. In a charge-and-discharge cycle of the battery, active ions are shuttled between the positive electrode plate and the negative electrode plate by intercalation and deintercalation. The electrolyte serves to conduct ions between the positive electrode plate and the negative electrode plate. Disposed between the positive electrode plate and the negative electrode plate, the separator primarily serves to prevent a short circuit between the positive electrode and the negative electrode, and is penetrable by active ions.

[Positive Electrode Plate]

The positive electrode plate includes a positive current collector and a positive film disposed on at least one surface of the positive current collector.

As an example, the positive current collector includes two surfaces opposite to each other in a thickness direction thereof. The positive film layer is disposed on either or both of the two opposite surfaces of the positive current collector.

In some embodiments, the positive current collector may be a metal foil or a composite current collector. For example, the metal foil may be an aluminum foil. The composite current collector may include a polymer material substrate and a metal layer formed on at least one surface of the polymer material substrate. The composite current collector may be formed by overlaying the polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the positive active material may be a positive active material that is well known in the art for use in a battery. As an example, the positive active material may include at least one of the following materials: olivine-structured lithium-containing phosphate, lithium transition metal oxide, and a modified compound thereof. However, this application is not limited to such materials, and other conventional materials usable as a positive active material of a battery may be used instead. One of the positive active materials may be used alone, or at least two thereof may be used in combination. Examples of the lithium transition metal oxide may include, but without being limited to, at least one of lithium cobalt oxide (such as $LiCoO_2$), lithium nickel oxide (such as $LiNiO_2$), lithium manganese oxide (such as $LiMnO_2$ and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3} O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.8}Co_{0.1}Mn_{0.1}O_2$ (briefly referred to as NCM811)), lithium nickel cobalt aluminum oxide (such as $LiNi_{0.85}Co_{0.15}Al_{0.05}O_2$), or a modified compound thereof. Examples of the olivine-structured lithium-containing phosphate may include, but without being limited to, at least one of lithium iron phosphate (such as $LiFePO_4$ (briefly referred to as LFP)), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

In some embodiments, the positive film layer further optionally includes a binder. As an example, the binder may include at least one of polyvinylidene difluoride (PVDF), polytetrafluoroethylene (PTFE), poly(vinylidene fluoride-co-tetrafluoroethylene-co-propylene), poly (vinylidene fluoride-co-hexafluoropropylene-co-tetrafluoroethylene), poly (tetrafluoroethylene-co-hexafluoropropylene), or fluorinated acrylate resin.

In some embodiments, the positive film layer further optionally includes a conductive agent. As an example, the conductive agent may include at least one of superconductive carbon, acetylene black, carbon black, Ketjen black, carbon dots, carbon nanotubes, graphene, or carbon nanofibers.

In some embodiments, the positive electrode plate may be prepared according to the following method: dispersing the ingredients of the positive electrode plate such as the positive active material, the conductive agent, the binder, and any other ingredients into a solvent (such as N-methyl-pyrrolidone) to form a positive slurry, coating a positive current collector with the positive slurry, and performing steps such as drying and cold calendering to obtain the positive electrode plate.

[Negative Electrode Plate]

The negative electrode plate includes a negative current collector and a negative film layer disposed on at least one surface of the negative current collector. The negative film layer includes a negative active material.

In some embodiments, the negative current collector may be a metal foil or a composite current collector. For example, the metal foil may be a copper foil. The composite current collector may include a polymer material substrate and a metal layer formed on at least one surface of the polymer material substrate. The composite current collector may be formed by overlaying the polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the negative film layer further optionally includes a binder. The binder is optionally at least one selected from styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), and carboxymethyl chitosan (CMCS).

In some embodiments, the negative film layer further optionally includes a conductive agent. The conductive agent is optionally at least one selected from superconductive carbon, acetylene black, carbon black, Ketjen black, carbon dots, carbon nanotubes, graphene, and carbon nanofibers.

In some embodiments, the negative film layer further optionally includes other agents, such as a thickener (for example, sodium carboxymethyl cellulose (CMC-Na)).

In some embodiments, the negative electrode plate may be prepared according to the following method: dispersing the ingredients of the negative electrode plate such as the negative active material, the conductive agent, and the binder and any other ingredients in a solvent (such as deionized water) to form a negative slurry, coating a negative current collector with the negative slurry, and performing steps such as drying and cold calendering to obtain the negative electrode plate.

[Electrolyte]

The electrolyte serves to conduct ions between the positive electrode plate and the negative electrode plate. The type of the electrolyte is not particularly limited in this application, and may be selected as required. For example, the electrolyte may be in a liquid state or gel state, or all solid state.

In some embodiments, the electrolyte is an electrolytic solution. The electrolytic solution includes an electrolyte salt and a solvent.

In some embodiments, the electrolyte salt is optionally at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro(oxalato)borate, lithium bis(oxalato)borate, lithium difluoro(bisoxalato) phosphate, and lithium tetrafluoro(oxalato)phosphate.

In some embodiments, the solvent is optionally at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethylsulfonyl)ethane.

In some embodiments, the electrolytic solution further optionally includes an electrolytic additive. For example, the electrolytic additive may include a negative film-forming additive or a positive film-forming additive. The electrolytic additive may further include an electrolytic additive capable of improving particular performance of the secondary battery, for example, an electrolytic additive for improving overcharge performance of the secondary battery, or an electrolytic additive for improving high- or low-temperature performance of the secondary battery.

[Separator]

The type of the separator is not particularly limited in this application, and may be any well-known porous separator that is highly stable both chemically and mechanically.

In some embodiments, the separator is made of a material that is optionally at least one selected from glass fiber, non-woven fabric, polyethylene, polypropylene, and polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be made into an electrode assembly by winding or stacking.

In some embodiments, the secondary battery may include an outer package. The outer package may be configured to package the electrode assembly and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The soft package may be made of plastic such as polypropylene, polybutylene terephthalate, or polybutylene succinate.

Figure 3:
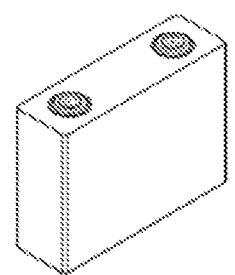
FIG. 3 is a schematic diagram of a secondary battery according to an embodiment of this application.

The shape of the secondary battery is not particularly limited in this application, and may be cylindrical, prismatic or any other shape. FIG. 3 shows a prismatic secondary battery 5 as an example.

Figure 4:
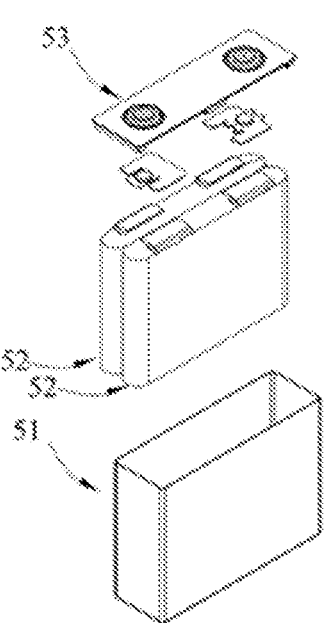
FIG. 4 is an exploded view of the secondary battery shown in FIG. 3 according to an embodiment of this application.

In some embodiments, referring to FIG. 4, the outer package may include a housing 51 and a cover plate 53. The housing 51 may include a bottom plate and a side plate connected to the bottom plate. The bottom plate and the side plate close in to form an accommodation cavity. An opening that communicates with the accommodation cavity is made on the housing 51. The cover plate 53 can fit and cover the opening to close the accommodation cavity. The positive electrode plate, the negative electrode plate, and the separator may be made into the electrode assembly 52 by winding or stacking. The electrode assembly 52 is packaged in the accommodation cavity. The electrolytic solution infiltrates in the electrode assembly 52. The number of electrode assemblies 52 in a secondary battery 5 may be one or more, and may be selected by a person skilled in the art as actually required.

In some embodiments, the secondary battery may be assembled into a battery module. The battery module may include one or more secondary batteries, and the specific number of secondary batteries in a battery module may be selected by a person skilled in the art depending on practical applications and capacity of the battery module.

Figure 5:
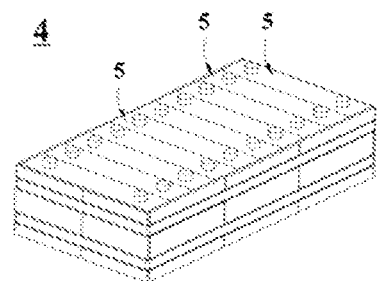
FIG. 5 is a schematic diagram of a battery module according to an embodiment of this application.

FIG. 5 shows a battery module 4 as an example. Referring to FIG. 5, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In some embodiments, the battery modules may be assembled into a battery pack. The battery pack may include one or more battery modules, and the specific number of battery modules in a battery pack may be selected by a person skilled in the art depending on practical applications and capacity of the battery pack.

Figure 6:
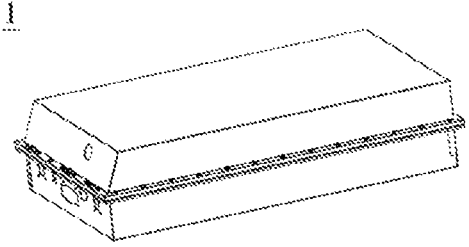
FIG. 6 is a schematic diagram of a battery pack according to an embodiment of this application.
Figure 7:
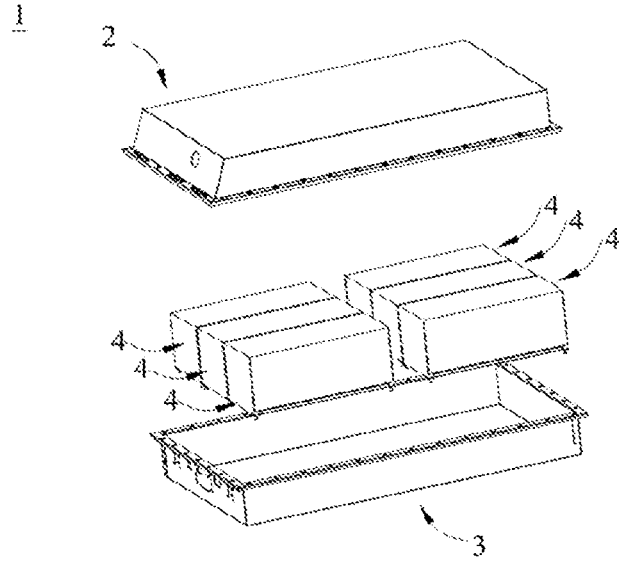
FIG. 7 is an exploded view of the battery pack shown in FIG. 6 according to an embodiment of this application.

FIG. 6 and FIG. 7 show a battery pack 1 as an example. Referring to FIG. 6 and FIG. 7, the battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this application provides an electrical device. The electrical device includes at least one of the secondary battery, the battery module, or the battery pack according to this application. The secondary battery, the battery module, or the battery pack may be used as a power supply of the electrical device, or used as an energy storage unit of the electrical device. The electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for the electrical device according to practical requirements of the electrical device.

Figure 8:
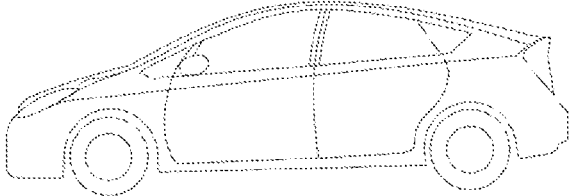
FIG. 8 is a schematic diagram of an electrical device that uses a secondary battery as a power supply according to an embodiment of this application.

FIG. 8 shows an electrical device as an example. The electrical device may be a battery electric vehicle, a hybrid electric vehicle, a plug-in hybrid electric vehicle, or the like. The electrical device may adopt a battery pack or a battery module in order to meet the requirements of the electrical device on a high power and a high energy density of the secondary battery.

In another example, the device may be a mobile phone, a tablet computer, a notebook computer, or the like. The device is generally required to be thin and light, and may have a secondary battery as a power supply.

EMBODIMENTS

The following describes embodiments of this application. The embodiments described below are illustrative, and are merely intended to construe this application but not to limit this application. In a case that no specific technique or condition is specified in an embodiment, the techniques or conditions described in the literature in this field or described in the instruction manual of the product may apply. A reagent or instrument used herein without specifying the manufacturer is a conventional product that is commercially available in the market.

Embodiment 1

<Preparing a Safety Coating Slurry>

Dispersing an additive Ag, graphite as a carbon material, carbon black as a conductive agent, and styrene-butadiene rubber (SBR) as a binder in deionized water at a mass ratio of 1:96:0.5:2.5, and stirring well at a rotation speed of 800 rpm in a 25° C. environment to obtain a safety coating slurry.

<Preparing a Negative Electrode Plate>

Mixing well graphite as a negative active material, carbon black as a conductive agent, SBR as a binder, and CMC-Na as a thickener at a mass ratio of 97:0.5:1.25:1.25, adding deionized water as a solvent, stirring well to make a negative slurry in which the solid content is 60 wt %. Coating an 8-μm thick negative current collector copper foil with the slurry evenly, and drying the slurry in a 110° C. environment. Performing cold calendering to obtain a negative electrode plate in which the thickness of a negative film layer on a single side is 100 μm. Subsequently, repeating the foregoing steps on the other surface of the negative electrode plate to obtain a negative electrode plate overlaid with a negative film layer on both sides. Applying the above-prepared safety coating slurry to the surface of the negative film layer on each side of the negative electrode plate evenly, so as to obtain a safety coating that is 5 μm thick. Performing drying, cold calendering, and slitting upon completion of the coating step, so as to obtain a negative electrode plate that is 76 mm×851 mm in size. Welding tabs, and leaving the negative electrode plate ready for future use.

<Preparing a Positive Electrode Plate>

Mixing well lithium nickel cobalt manganese oxide (NCM811) ternary material as a positive active material, carbon black as a conductive agent, and PVDF as a binder at a mass ratio of 95:2:3, and dissolving the mixture in a solvent N-methyl-pyrrolidone (NMP). Stirring well to make a positive slurry in which the solid content is 75 wt %. Coating one surface of a 10-μm thick positive current collector aluminum foil with the positive slurry evenly, and drying the slurry in a 130° C. environment. Performing cold calendering to obtain a positive electrode plate coated with a 110-μm thick positive active material layer on a single side. Subsequently, repeating the foregoing steps on the other surface of the positive electrode plate to obtain a positive electrode plate coated with the positive active material layer on both sides. Performing drying, cold calendering, and slitting upon completion of the coating step, so as to obtain a positive electrode plate that is 74 mm×867 mm in size. Welding tabs, and leaving the positive electrode plate ready for future use.

<Preparing an Electrolytic Solution>

Mixing well ethylene carbonate, ethyl methyl carbonate, and diethyl carbonate at a volume ratio of 1:1:1 in an argon atmosphere glovebox (in which the content of $H_2O$ is less than 0.1 ppm, and the content of $O_2$ is less than 0.1 ppm), so as to obtain an organic solvent. Subsequently, adding and dissolving a lithium salt $LiPF_6$ in the organic solvent, and stirring well to obtain an electrolytic solution in which the concentration of the lithium salt is 1 mol/L.

<Preparing a Separator>

Using a 14-μm thick polypropylene (PP) film (manufactured by Celgard) as a separator.

<Preparing a Secondary Battery>

Stacking the above-prepared positive electrode plate, separator, and negative electrode plate in sequence in such a way that the separator is located between the positive electrode plate and the negative electrode plate to serve a function of separation, and winding the stacked structure to obtain an electrode assembly. Putting the electrode assembly into an aluminum plastic film housing, dehydrating the electrode assembly at 80° C., and then injecting the prepared electrolytic solution. Performing steps such as vacuum sealing, standing, chemical formation, and shaping to obtain a secondary battery.

Embodiments 2 to 5

Identical to Embodiment 1 except that Nc/Pc and Nd/Pd are adjusted to the values shown in Table 2 according to the parameters in Table 1.

Embodiment 6

Identical to Embodiment 2 except that, in <Preparing a negative electrode plate>, no safety coating is disposed, and, in <Preparing a separator>, a first surface of the separator is coated with the safety coating slurry evenly.

Embodiments 7 to 9

Identical to Embodiment 2 except that the type of the negative active material is adjusted according to Table 3.

Embodiments 10 to 14

Identical to Embodiment 7 except that the type of the additive is adjusted according to Table 3.

Embodiments 15 to 23

Identical to Embodiment 12 except that the mass ratio between the additive and the carbon material is adjusted according to Table 3.

Embodiments 24 to 27

Identical to Embodiment 7 except that the thickness of the safety coating is adjusted according to Table 3.

Comparative Embodiments 1 to 2

Identical to Embodiment 2 except that Nc/Pc and Nd/Pd are adjusted to the values shown in Table 2 according to the parameters in Table 1 and no safety coating is disposed.

Comparative Embodiment 3

Identical to Embodiment 1 except that Nc/Pc and Nd/Pd are adjusted to the values shown in Table 2 according to the parameters in Table 1.

In addition, the secondary batteries prepared in Embodiments 1 to 27 and Comparative Embodiments 1 to 3 are subjected to a performance test.

(1) Testing a Charge Capacity Per Gram and a Discharge Capacity Per Gram of the Negative Active Material <Preparing a Button Battery>

Mixing well graphite as a negative active material to be tested, carbon black as a conductive agent, SBR as a binder, CMC-Na as a thickener at a mass ratio of 97:0.5:1.25:1.25, adding deionized water as a solvent, and stirring the mixture to form a slurry in which the solid content is 40 wt %. Coating a current collector aluminum foil with a 100-μm thick slurry layer by using a scraper. Drying the slurry layer in a 130° C. vacuum oven for 12 hours, and cutting the foil into discs of 1 cm in diameter in a dry environment by using a stamping press. In a glovebox, using a metal lithium sheet as a counter electrode, using a 14-μm thick PP film as a separator, and adding the electrolytic solution prepared in each embodiment or comparative embodiment to form a button battery.

<Testing a Charge Capacity Per Gram and a Discharge Capacity Per Gram>

Charging the above-prepared button battery at a constant current of 0.33 C at 25° C. until the voltage reaches 2 V, and then charging the battery at a constant voltage of 2 V until the current is less than or equal to 0.05 C. Subsequently, discharging the button battery at a constant current of 0.33 C until the voltage reaches 0.05 V, and recording an actual discharge capacity of the button battery as $C_{10}$ (mAh). Discharge capacity per gram of the button battery is $C_1$ (mAh/g)=$C_0/W_1$, and charge capacity per gram of the button battery is $C_3$ (mAh/g)=375 mAh/g. In the formula above, $W_1$ is the mass (g) of the negative active material.

(2) Testing a Charge Capacity Per Gram and a Discharge Capacity Per Gram of the Positive Active Material <Preparing a Button Battery>

Mixing well an NCM811 ternary material as a positive active material to be tested, carbon black as a conductive agent, and PVDF as a binder at a mass ratio of 80:10:10, adding NMP as a solvent, and stirring the mixture to form a slurry in which the solid content is 40 wt %. Coating a current collector aluminum foil with a 100-μm thick slurry layer by using a scraper. Drying the slurry layer in a 130° C. vacuum oven for 12 hours, and cutting the foil into discs of 1 cm in diameter in a dry environment by using a stamping press. In a glovebox, using a metal lithium sheet as a counter electrode, using a 14-μm thick PP film as a separator, and adding the electrolytic solution prepared in each embodiment or comparative embodiment to form a button battery.

<Testing a Charge Capacity Per Gram and a Discharge Capacity Per Gram>

Charging the above-prepared button battery at a constant current of 0.33 C at 25° C. until the voltage reaches 4.25 V, and then charging the battery at a constant voltage of 3.65 V until the current is less than or equal to 0.05 C. Subsequently, discharging the button battery at a constant current of 0.33 C until the voltage reaches 2.5 V, and recording an actual discharge capacity of the button battery as $C_{20}$ (mAh). Discharge capacity per gram of the button battery is $C_2$ (mAh/g)=$C_0/W_2$, and charge capacity per gram of the button battery is $C_4$ (mAh/g)=235 mAh/g. In the formula above, $W_2$ is the mass (g) of the positive active material.

(3) Testing the Coating Mass

Cutting an electrode plate (positive electrode plate or negative electrode plate) coated with a film layer (positive film layer or negative film layer) on a single side to make discs that each cover an area of 1 cm². Weighing 20 discs, and calculating the coating mass according to a formula: coating mass=(mass of a disc−mass of the current collector), so as to obtain a plurality of calculated values. Averaging out the calculated values to obtain the coating mass of the film layer in each embodiment or each comparative embodiment.

Determining the mass of the current collector: Taking a specimen from the film layer region, and weighing the specimen to obtain the mass.

Determining the mass of the disc and the mass of the current collector: (unit: g).

(4) Calculating Nc, Pc, Nd, and Pd $$Nc=C_3 \times k_1 \times cw_1; \quad Pc=C_4 \times k_2 \times cw_2; \quad Nd=C_1 \times k_1 \times cw_1; \quad Pd=C_2 \times k_2 \times cw_2.$$

(5) Testing the Energy Density

In <Preparing a secondary battery> in each embodiment and each comparative embodiment, the steps of the preparation method are the same as those in each embodiment and each comparative embodiment except that a negative slurry and a positive slurry are prepared according to the mixing ratio of the slurry described in <Preparing a button battery>. A secondary battery with a capacity of 5 Ah is prepared, during which the voltage range is 2.5 V to 4.25 V and the charge current and the discharge current are 0.33 C.

$$\text{Energy (Wh)}=\text{capacity (Ah)} \times \text{plateau voltage (V)}$$

$$\text{Mass energy density (Wh/kg)}=\text{energy (Wh)}/\text{mass (kg)}$$

(6) Testing the Cycle Performance

Charging the battery at a constant current of 0.7 C under a 25° C. temperature until the voltage reaches 4.4 V, charging the battery at a constant voltage until the current reaches 0.025 C, leaving the battery to stand for 5 minutes, and then discharging the battery at a current of 0.5 C until the voltage reaches 3.0 V. Using the capacity obtained in this step as an initial capacity. Performing a cycle test in which the battery is charged at 0.7 C and discharged at 0.5 C. Comparing the capacity obtained in each step with the initial capacity to obtain a plurality of ratios. Plotting a capacity fading curve by using the ratios. The room-temperature cycle life of the secondary battery is represented by the number of cycles completed by the secondary battery in a 25° C. environment when the capacity retention rate drops to 90%.

The preparation parameters and performance parameters in Embodiments 1 to 6 and Comparative Embodiments 1 to 3 are shown in Table 1 and Table 2, and the preparation parameters and performance parameters in Embodiments 7 to 27 are shown in Table 3:

TABLE 1

| | $C_2$ (mAh/ g) | $C_4$ (mAh/ g) | $cw_2$ (g/ cm²) | $k_2$ (%) | $C_1$ (mAh/ g) | $C_3$ (mAh/ g) | $cw_1$ (g/ cm²) | $k_1$ (%) | Nc | Pc | Nd | Pd |
|---|---|---|---|---|---|---|---|---|---|---|---|---|
| Embodiment 1 | 215 | 248 | 0.593 | 95 | 360 | 382 | 0.189 | 97 | 70.03 | 139.71 | 66.00 | 121.12 |
| Embodiment 2 | 215 | 248 | 0.593 | 95 | 360 | 382 | 0.226 | 97 | 83.74 | 139.71 | 78.92 | 121.12 |
| Embodiment 3 | 215 | 248 | 0.593 | 95 | 360 | 382 | 0.264 | 97 | 97.82 | 139.71 | 92.19 | 121.12 |
| Embodiment 4 | 215 | 248 | 0.593 | 95 | 360 | 382 | 0.302 | 97 | 111.77 | 139.71 | 105.37 | 121.12 |
| Embodiment 5 | 215 | 248 | 0.593 | 95 | 360 | 382 | 0.339 | 97 | 125.61 | 139.71 | 118.38 | 121.12 |
| Embodiment 6 | 215 | 248 | 0.593 | 95 | 360 | 382 | 0.226 | 97 | 83.74 | 139.71 | 78.92 | 121.12 |
| Comparative Embodiment 1 | 215 | 248 | 0.593 | 95 | 360 | 382 | 0.415 | 97 | 153.77 | 139.71 | 144.92 | 121.12 |
| Comparative Embodiment 2 | 215 | 248 | 0.593 | 95 | 360 | 382 | 0.226 | 97 | 83.74 | 139.71 | 78.92 | 121.12 |

TABLE 1-continued

| | C₂ (mAh/ g) | C₄ (mAh/ g) | cw₂ (g/ cm²) | k₂ (%) | C₁ (mAh/ g) | C₃ (mAh/ g) | cw₁ (g/ cm²) | k₁ (%) | Nc | Pc | Nd | Pd |
|---|---|---|---|---|---|---|---|---|---|---|---|---|
| Comparative Embodiment 3 | 215 | 248 | 0.593 | 95 | 360 | 382 | 0.415 | 97 | 153.77 | 139.71 | 144.92 | 121.12 |

TABLE 2

| | | | Safety coating | | | | | | |
|---|---|---|---|---|---|---|---|---|---|
| | Nc/ Pc | Nd/ Pd | Type of additive | Type of carbon material | Mass ratio between additive and carbon material | Thickness (μm) | Location | Energy density (Wh/ kg) | Cycle performance (number of cycles) |
| Embodiment 1 | 0.5 | 0.54 | Ag | Graphite | 20: 100 | 5 | Surface of negative film layer | 385 | 800 |
| Embodiment 2 | 0.6 | 0.65 | Ag | Graphite | 20: 100 | 5 | Surface of negative film layer | 372 | 1200 |
| Embodiment 3 | 0.7 | 0.75 | Ag | Graphite | 20: 100 | 5 | Surface of negative film layer | 363 | 1600 |
| Embodiment 4 | 0.8 | 0.87 | Ag | Graphite | 20: 100 | 5 | Surface of negative film layer | 352 | 1850 |
| Embodiment 5 | 0.9 | 0.98 | Ag | Graphite | 20: 100 | 5 | Surface of negative film layer | 340 | 2000 |
| Embodiment 6 | 0.6 | 0.65 | Ag | Graphite | 20: 100 | 5 | First surface of separator | 372 | 1350 |
| Comparative Embodiment 1 | 1.1 | 1.2 | \ | \ | \ | \ | \ | 310 | 1700 |
| Comparative Embodiment 2 | 0.6 | 0.65 | \ | \ | \ | \ | \ | 378 | 600 |
| Comparative Embodiment 3 | 1.1 | 1.2 | Ag | Graphite | 20: 100 | 5 | Surface of negative film layer | 305 | 2000 |

Note:
"\" in Table 2 indicates nonexistence of the corresponding parameter.

TABLE 3

| | Safety coating | | | | | | |
|---|---|---|---|---|---|---|---|
| | Type of negative active material | Type of additive | Type of carbon material | Mass ratio between additive and carbon material | Thickness (µm) | Energy density (Wh/kg) | Cycle performance (number of cycles) |
| Embodiment 2 | Graphite | Ag | Graphite | 20:100 | 5 | 372 | 1200 |
| Embodiment 7 | Silicon oxide: graphite = 1:4 | Ag | Graphite | 20:100 | 5 | 475 | 850 |
| Embodiment 8 | Silicon-carbon composite: graphite = 1:4 | Ag | Graphite | 20:100 | 5 | 500 | 420 |
| Embodiment 9 | Fe3O4 | Ag | Graphite | 20:100 | 5 | 400 | 1020 |
| Embodiment 10 | Silicon oxide: graphite = 1:4 | Au | Graphite | 20:100 | 5 | 465 | 880 |
| Embodiment 11 | Silicon oxide: graphite = 1:4 | Al | Graphite | 20:100 | 5 | 472 | 795 |
| Embodiment 12 | Silicon oxide: graphite = 1:4 | MgO | Graphite | 20:100 | 5 | 470 | 820 |
| Embodiment 13 | Silicon oxide: graphite = 1:4 | Mg(NO3)2 | Graphite | 20:100 | 5 | 465 | 735 |
| Embodiment 14 | Silicon oxide: graphite = 1:4 | Mg(PO3)2 | Graphite | 20:100 | 5 | 457 | 725 |
| Embodiment 15 | Silicon oxide: graphite = 1:4 | MgO | Graphite | 0.05:100 | 5 | 482 | 650 |
| Embodiment 16 | Silicon oxide: graphite = 1:4 | MgO | Graphite | 10:100 | 5 | 450 | 720 |
| Embodiment 17 | Silicon oxide: graphite = 1:4 | MgO | Graphite | 15:100 | 5 | 452 | 730 |
| Embodiment 18 | Silicon oxide: graphite = 1:4 | MgO | Graphite | 25:100 | 5 | 445 | 745 |
| Embodiment 19 | Silicon oxide: graphite =1: 4 | MgO | Graphite | 30:100 | 5 | 440 | 805 |
| Embodiment 20 | Silicon oxide: graphite = 1:4 | MgO | Graphite | 50:100 | 5 | 435 | 810 |
| Embodiment 21 | Silicon oxide: graphite = 1:4 | MgO | Graphite | 60:100 | 5 | 430 | 820 |
| Embodiment 22 | Silicon oxide: graphite = 1:4 | MgO | Graphite | 80:100 | 5 | 424 | 825 |

TABLE 3-continued

| | Safety coating | | | | | |
| | Type of negative active material | Type of additive | Type of carbon material | Mass ratio between additive and carbon material | Thickness (μm) | Energy density (Wh/kg) | Cycle performance (number of cycles) |
|---|---|---|---|---|---|---|---|
| Embodiment 23 | Silicon oxide: graphite = 1:4 | MgO | Graphite | 100:100 | 5 | 418 | 826 |
| Embodiment 24 | Silicon oxide: graphite = 1:4 | Ag | Graphite | 20: 100 | 0.5 | 483 | 650 |
| Embodiment 25 | Silicon oxide: graphite = 1:4 | Ag | Graphite | 20: 100 | 3 | 460 | 800 |
| Embodiment 26 | Silicon oxide: graphite = 1:4 | Ag | Graphite | 20: 100 | 10 | 445 | 950 |
| Embodiment 27 | Silicon oxide: graphite = 1:4 | Ag | Graphite | 20: 100 | 15 | 434 | 1000 |

According to the above results, all the secondary batteries in Embodiments 1 to 27 have achieved good cycle performance when a safety coating is disposed and the values of Nc/Pc and/or Nd/Pd fall within the ranges specified in this application. Evidently, the lithium dendrites generated during the cycling of the secondary battery do not pierce the secondary battery, and therefore, the secondary battery achieves good safety performance. In addition, a high energy density of the secondary battery is maintained.

As can be seen from Embodiments 1 to 5, with the same safety coating applied in the secondary batteries, by controlling the values of the Nc/Pc ratio and the Nd/Pd ratio to fall within the ranges specified herein, this application can maintain a high energy density while achieving good cycle performance and safety performance of the secondary battery.

As can be seen from Embodiments 2 and 6, with the same Nc/Pc ratio and the same Nd/Pd ratio of the secondary battery, by disposing the safety coating at a location specified herein, this application can maintain a high energy density while achieving good cycle performance and safety performance of the secondary battery.

By contrast, in Comparative Embodiment 1, no safety coating is disposed in the secondary battery, and the values of the Nc/Pc ratio and the Nd/Pd ratio fall outside the ranges specified herein, so that the energy density, cycle performance, and safety performance of the secondary battery are not all improved effectively at the same time.

In Comparative Embodiment 2, the values of the Nc/Pc ratio and the Nd/Pd ratio of the secondary battery fall within the ranges specified herein, but no safety coating is disposed in the secondary battery, so that the cycle performance and the safety performance of the secondary battery decline, and the energy density, the cycle performance, and the safety performance of the secondary battery are not all improved effectively at the same time.

In Comparative Embodiment 3, the values of the Nc/Pc ratio and the Nd/Pd ratio of the secondary battery fall outside the ranges specified herein, so that the energy density, cycle performance, and safety performance of the secondary battery are not all improved effectively at the same time.

The type of the negative active material usually also affects the performance of the secondary battery. As can be seen from Embodiment 2 and Embodiments 7 to 9, when the type of the negative active material is the type specified herein, the secondary battery achieves a high energy density in addition to good cycle performance and safety performance.

The type of the additive usually also affects the performance of the secondary battery. As can be seen from Embodiment 7 and Embodiments 10 to 14, when the type of the additive is the type specified herein, the secondary battery achieves a high energy density in addition to good cycle performance and safety performance.

The mass ratio between the additive and the carbon material usually also affects the performance of the secondary battery. As can be seen from Embodiment 12 and Embodiments 15 to 23, when the mass ratio between the additive and the carbon material falls within the range specified herein, the secondary battery achieves a high energy density in addition to good cycle performance and safety performance.

The thickness of the safety coating usually also affects the performance of the secondary battery. As can be seen from Embodiment 7 and Embodiments 24 to 27, when the thickness of the safety coating falls within the range specified herein, the secondary battery achieves a high energy density in addition to good cycle performance and safety performance.

It is hereby noted that this application is not limited to the foregoing embodiments. The foregoing embodiments are merely examples. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A secondary battery, comprising a negative electrode plate, a positive electrode plate, and a separator located between the negative electrode plate and the positive electrode plate, wherein the negative electrode plate or the separator comprises a safety coating, the safety coating is disposed between the negative electrode plate and the separator and comprises an additive and a carbon material, the additive comprises a metal element, the safety coating allows deposition of lithium ion on a side of the safety coating adjacent to the negative electrode plate and allows formation of an alloy of the metal element and lithium in the safety coating during charge-and-discharge cycles of the secondary battery; and a negative electrode charge capacity Nc and a positive electrode charge capacity Pc of the secondary battery satisfy: $0.6 \leq Nc/Pc < 1$, a negative electrode discharge capacity Nd and a positive electrode discharge capacity Pd of the secondary battery satisfy: $0.65 \leq Nd/Pd < 1$.

2. The secondary battery according to claim 1, wherein the negative electrode plate comprises a negative current collector and a negative film layer disposed on at least one surface of the negative current collector, and the safety coating is disposed on a surface of the negative film layer.

3. The secondary battery according to claim 1, wherein the safety coating is disposed on a first surface that is of the separator and that is oriented toward the negative electrode plate.

4. The secondary battery according to claim 1, wherein a thickness of the safety coating is 0.5 μm to 15 μm.

5. The secondary battery according to claim 1, wherein the negative electrode charge capacity Nc and the positive electrode charge capacity Pc of the secondary battery satisfy: $0.7 \leq Nc/Pc \leq 0.85$.

6. The secondary battery according to claim 1, wherein the negative electrode discharge capacity Nd and the positive electrode discharge capacity Pd of the secondary battery satisfy: $0.65 \leq Nd/Pd \leq 0.87$.

7. The secondary battery according to claim 1, wherein a negative film layer comprises a negative active material, and the negative active material comprises at least one of graphite, a silicon-carbon composite, silicon oxide, tin oxide, iron oxide, or titanium oxide.

8. The secondary battery according to claim 1, wherein the additive comprises the additive comprises at least one of a simple metal of gold, a simple metal of silver, a simple metal of magnesium, and a simple metal of aluminum, an oxide of silver, an oxide of magnesium, an oxide of aluminum, a nitrate of silver, a nitrate of magnesium, a nitrate of aluminum, a phosphate of silver, a phosphate of magnesium, a phosphate of aluminum, the carbon material comprises at least one of graphite, graphene, and carbon nanotube, a mass ratio between the additive and the carbon material is 0.05: 100 to 100:100.

9. The secondary battery according to claim 8, wherein the mass ratio between the additive and the carbon material is 10:100 to 80:100.

10. The secondary battery according to claim 8, wherein the mass ratio between the additive and the carbon material is 20:100 to 50:100.

11. A battery module, comprising the secondary battery according to claim 1.

12. A battery pack, comprising the battery module according to claim 11.

13. An electrical device, comprising the secondary battery according to claim 1.

14. An electrical device, comprising the secondary battery according to the battery module according to claim 11.

15. An electrical device, comprising the secondary battery according to the battery pack according to claim 12.

16. The secondary battery according to claim 8, wherein the additive comprises at least one of a simple metal of silver and a simple metal of gold.

17. The secondary battery according to claim 8, wherein the additive comprises an oxide of silver.

18. The secondary battery according to claim 8, wherein the additive comprises at least one of a nitrate of silver and a phosphate of silver.

19. The secondary battery according to claim 8, wherein the additive comprises at least one of a nitrate of silver, a nitrate of magnesium, a phosphate of magnesium, and a phosphate of aluminum.

20. The secondary battery according to claim 8, wherein the safety coating is free from a silicon-containing compound.

* * * * *